(12) United States Patent
Muramatsu et al.

(10) Patent No.: US 11,077,690 B2
(45) Date of Patent: Aug. 3, 2021

(54) PRINTING APPARATUS, AN AMOUNT OF DISPLACEMENT CALCULATING METHOD, AND A TESTING CHART

(71) Applicant: SCREEN HOLDINGS CO., LTD., Kyoto (JP)

(72) Inventors: Asuka Muramatsu, Kyoto (JP); Kazuki Fukui, Kyoto (JP); Tomotaka Kato, Kyoto (JP); Kazuki Yamanaka, Kyoto (JP); Seiya Nomura, Kyoto (JP); Takaharu Yamamoto, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 15/753,875

(22) PCT Filed: Sep. 20, 2016

(86) PCT No.: PCT/JP2016/077669
§ 371 (c)(1),
(2) Date: Feb. 20, 2018

(87) PCT Pub. No.: WO2017/051796
PCT Pub. Date: Mar. 30, 2017

(65) Prior Publication Data
US 2018/0272775 A1 Sep. 27, 2018

(30) Foreign Application Priority Data
Sep. 24, 2015 (JP) .............................. JP2015-186837

(51) Int. Cl.
*B41J 2/21* (2006.01)
*G06K 15/02* (2006.01)
(Continued)

(52) U.S. Cl.
CPC ........... *B41J 29/393* (2013.01); *B41J 2/2135* (2013.01); *B41J 2/2146* (2013.01); *G06K 15/027* (2013.01);
(Continued)

(58) Field of Classification Search
None
See application file for complete search history.

(56) References Cited

U.S. PATENT DOCUMENTS 6,121,993 A * 9/2000 Maekawara ......... H04N 1/0671
250/205
7,824,001 B2 * 11/2010 Fienup ................ B41J 2/16532
347/19

(Continued)

FOREIGN PATENT DOCUMENTS

| EP | 0735504 A2 | 10/1996 |
| EP | 1874035 A2 | 1/2008 |
| JP | 2003-341016 A | 12/2003 |

OTHER PUBLICATIONS

Search Report issued in corresponding International Patent Application No. PCT/JP2016/077669, dated Dec. 6, 2016.
(Continued)

*Primary Examiner* — Alejandro Valencia
(74) *Attorney, Agent, or Firm* — McDermott Will & Emery LLP

(57) ABSTRACT

A printing apparatus of this invention scans with a tester a testing chart printed by a printing controller to acquire testing image data. A total amount of displacement calculator calculates an amount of displacement of a recording position including a direction of misregister as a total amount of displacement, based on a large amount of displacement determined by a large amount of displacement determiner, a direction of displacement detected by a direction of displacement detector, a shift amount corresponding (Continued)

to an amount of displacement detecting chart determined by an amount of displacement detecting chart determiner, and a peak position of the amount of displacement detecting chart determined by the amount of displacement detecting chart determining unit. Thus, since a total amount of displacement of the misregister can be calculated only by printing the testing chart on web paper WP, an amount of displacement of the misregister in the transport direction can be obtained easily in a short time.

4 Claims, 12 Drawing Sheets

(51) Int. Cl.
*B41J 29/393* (2006.01)
*H04N 1/50* (2006.01)
*B41J 2/045* (2006.01)

(52) U.S. Cl.
CPC .......... *H04N 1/506* (2013.01); *B41J 2/04505* (2013.01); *B41J 2/04586* (2013.01); *B41J 2029/3935* (2013.01)

(56) References Cited

U.S. PATENT DOCUMENTS

| | | | |
|---|---|---|---|
| 7,894,109 B2 * | 2/2011 | McElvain | H04N 1/506 358/1.9 |
| 2003/0020930 A1 | 1/2003 | Yagi | |
| 2004/0057756 A1 * | 3/2004 | Taka | G03G 15/5058 399/301 |
| 2012/0062626 A1 | 3/2012 | Ishikawa et al. | |
| 2012/0169810 A1 | 7/2012 | Nishioka et al. | |

OTHER PUBLICATIONS

Supplementary European Search Report issued in corresponding European Patent Application No. 16848584.5, dated Apr. 9, 2019.

* cited by examiner

TRANSPORT DIRECTION

TRANSPORT DIRECTION

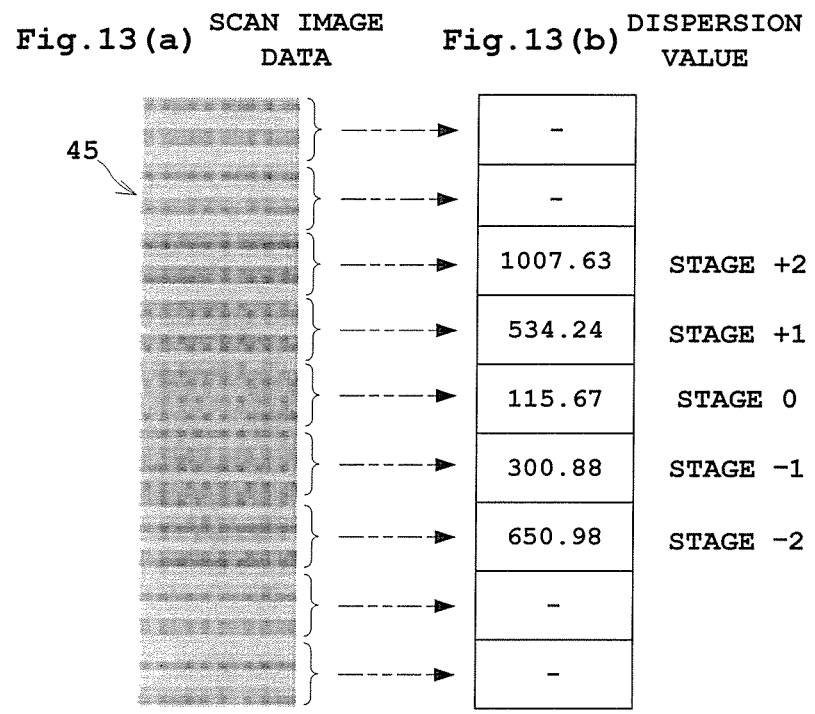
Fig.13(a) SCAN IMAGE DATA    Fig.13(b) DISPERSION VALUE
Fig.14
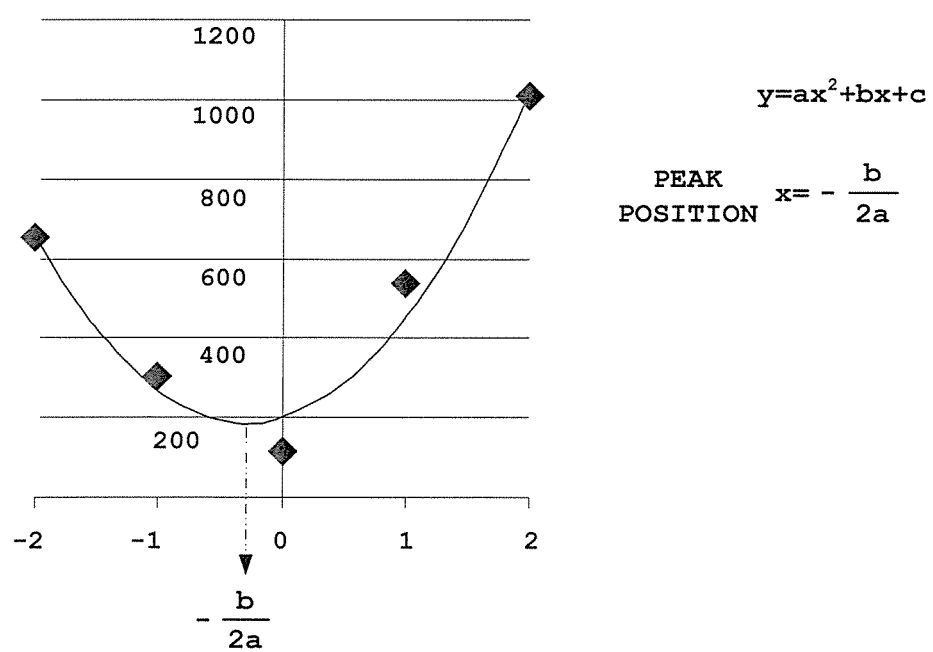

PRINTING APPARATUS, AN AMOUNT OF DISPLACEMENT CALCULATING METHOD, AND A TESTING CHART

CROSS REFERENCE

This application is the U.S. National Phase under 35 U.S.C. § 371 of International Application No. PCT/JP2016/077669, filed on Sep. 20, 2016, which claims the benefit of Japanese Application No. 2015-186837, filed on Sep. 24, 2015, the entire contents of each are hereby incorporated by reference.

TECHNICAL FIELD

This invention relates to a printing apparatus, an amount of displacement calculating method, and a testing chart, which, when printing on a printing medium, make various prints including a testing chart for testing a misregister having a printing position displaced in a transport direction of the printing medium.

BACKGROUND ART

Conventionally, printing apparatus for making prints include, for example, an inkjet printing apparatus having a plurality of print heads arranged at intervals in a direction in which printing paper is transported. This inkjet printing apparatus performs printing while adjusting timing of printing by each print head according to a distance between the print heads and a transporting speed of the printing paper. Any shift of the timing will result in a misregister with a printing position displaced in the transport direction. Such a misregister lowers print quality, and thus poses a challenge to measure and correct an amount of displacement in the misregister.

In a method adopted to determine such an amount of displacement, a pattern for evaluation is continuously printed on plural sheets of predetermined printing paper, each is measured visually with a magnifying glass or the like, or measured with a dedicated measuring instrument, then an average amount of displacement is grasped, and an amount of correction is calculated. It is general practice to correct the inkjet printing apparatus with the amount of correction (see Patent Document 1, for example).

PRIOR ART DOCUMENT

Patent Document

[Patent Document 1]
Unexamined Patent Publication No. 2003-341016

SUMMARY OF INVENTION

Technical Problem

However, the conventional example with such construction has the following problem.

That is, with the conventional technique, since measurement of an amount of displacement of the misregister is complicated, there is a problem of taking a long time to obtain the amount of displacement in the transport direction.

This invention has been made having regard to the state of the art noted above, and its object is to provide a printing apparatus, an amount of displacement calculating method, and a testing chart, which can obtain an amount of displacement of a misregister in a transport direction easily in a short time.

Solution to Problem

To fulfill the above object, this invention provides the following construction.

That is, the invention defined in claim 1 provides a printing apparatus for printing on a printing medium transported, comprising a plurality of print heads arranged at intervals in a transport direction of the printing medium; a printing control device for causing a testing chart to be printed on the printing medium, the testing chart including a first detecting chart for detecting a direction of displacement of a recording position in the transport direction relative to a reference print head, by means of the reference print head and a print head spaced in the transport direction from the reference print head, the reference print head being a print head selected from the plurality of print heads to serve as reference for recording positions of the plurality of print heads; and a second detecting chart formed of a plurality of amount of displacement detecting charts including an amount of displacement detecting chart having a peak position corresponding to a maximum or a minimum of density and moving in response to amounts of displacement in order to detect an amount of displacement of the recording position in the transport direction relative to the reference print head, and the amount of displacement detecting chart printed with drawing positions by the print head in the amount of displacement detecting chart shifted in the transport direction by predetermined shift amounts corresponding to the integral multiples of a maximum amount of displacement detectable with the amount of displacement detecting chart; a scanning device for scanning the testing chart to acquire testing image data; a direction of displacement detecting device for discriminating the first detecting chart from the testing image data, and detecting a direction of displacement in the transport direction of the recording position; an amount of displacement detecting chart determining device for discriminating the second detecting chart from the testing image data, and determining one having the peak position closest to a middle position of the amount of displacement detecting chart out of the plurality of amount of displacement detecting charts; and a total amount of displacement calculating device for calculating the amount of displacement of the recording position as a total amount of displacement based on the direction of displacement detected by the direction of displacement detecting device, the shift amount of the amount of displacement detecting chart determined by the amount of displacement detecting chart determining device, and the amount of displacement corresponding to the peak position of the amount of displacement detecting chart determined by the amount of displacement detecting chart determining device.

[Functions and effects] According to the invention defined in claim 1, testing image data is acquired by scanning with the tester the testing chart printed by the printing control device. The total amount of displacement calculating device calculates an amount of displacement of a recording position including the direction of displacement as a total amount of displacement, based on a direction of displacement detected by the direction of displacement detecting device, a shift amount corresponding to an amount of displacement detecting chart determined by the amount of displacement detecting chart determining device, and a peak position of the amount of displacement detecting chart determined by the amount of displacement detecting chart determining device. Therefore, since the total amount of displacement of the misregister can be calculated only by printing the testing chart on the printing medium, the amount of displacement of the misregister in the transport direction can be obtained easily in a short time.

With the plurality of amount of displacement detecting charts of the second detecting chart of the testing chart, the periodicity of the amount of displacement detecting charts may cause the shift amount and peak position of the amount of displacement detecting charts to become similar even when a misregister occurs in the opposite direction. However, the direction of displacement detected with the first detecting chart can prevent an erroneous determination indicating the opposite direction. While a detectable amount of displacement is small where only one amount of displacement detecting chart is used, increased amounts of displacement can be calculated since the second detecting chart includes the plurality of amount of displacement detecting charts with varied shift amounts.

In this invention, it is preferred to further comprise a correcting device for creating displacement correction data based on the total amount of displacement calculated by the total amount of displacement calculating device, and correcting timing of printing by the plurality of print heads based on the displacement correction data (Claim 2).

Since the correcting device corrects timing of printing by the plurality of print heads based on the total amount of displacement, higher print quality is realizable.

In this invention, it is preferred that the printing control device further causes a third testing chart to be printed as the testing chart for detecting larger amounts of displacement than with the amount of displacement detecting chart of the second detecting chart by enlarging the amount of displacement detecting chart in the transport direction; the apparatus further comprising a large amount of displacement determining device for discriminating the third detecting chart from the testing image data, and determining the amount of displacement corresponding to the peak position as a large amount of displacement; and that the total amount of displacement detecting device calculates the total amount of displacement by combining also the large amount of displacement (Claim 3).

The third detecting chart corresponds to the amount of displacement detecting chart enlarged in the transport direction. The total amount of displacement calculating device calculates a total amount of displacement combining also a large amount of displacement indicated by its peak position and having the amount of displacement enlarged in the transport direction. It is therefore possible to obtain also a large amount of displacement that cannot be detected with the second detecting chart alone.

In this invention, it is preferred that the amount of displacement detecting chart includes a plurality of baselines formed by the reference print head at constant intervals in a direction perpendicular to the transport direction; and a plurality of displacement lines printed by a print head spaced in the transport direction from the reference print head, to be parallel to the plurality of baselines and in middles between the baselines or in middles of the baselines; the plurality of displacement lines being printed with deviations from baselines adjacent the middle baseline, which deviations increase progressively from the baseline in the middle of the plurality of baselines toward the baselines formed at ends in the transport direction (Claim 4).

When no misregister has occurred in the transport direction and when the displacement lines are printed in the middles between the baselines, it will become darkest in density difference since all of the baselines and displacement lines are exposed in the middles of the plurality of baselines. When the displacement lines are printed in the middles between the baselines, it will become brightest in density difference since the baselines and displacement lines completely overlap one another in the middles of the plurality of baselines. When a misregister has occurred in the transport direction, the displacement lines will have moved relative to the baselines according to the extent of the misregister in the transport direction. This will result in a change in density difference, whereby a peak position of a dark pattern or a peak position of a bright pattern moves in the transport direction from the middle of the plurality of baselines. Thus, the deviation in the peak position corresponds to the amount of displacement.

In this invention, it is preferred that the first detecting chart includes downstream direction line segments formed of reference line segments printed by the reference print head, and moving line segments printed by a print head spaced in the transport direction from the reference print head, which are printed to fit within a width in the transport direction of the reference line segments and to be in close contact with downstream sides in the transport direction; and upstream direction line segments formed of the reference line segments, and moving line segments printed by the print head spaced in the transport direction from the reference print head, which are printed to fit within the width in the transport direction of the reference line segments and to be in close contact with upstream sides in the transport direction (Claim 5).

Since only the moving line segments of the downstream line segments and upstream line segments move in a direction in which the misregister has occurred, the line width increases in the direction of the side of close contact. Consequently, density becomes high in the direction in which the misregister has occurred, whereby the direction in which the misregister has occurred can be obtained with the first detecting chart.

In this invention, it is preferred that the amount of displacement detecting chart determining device obtains a dispersion value of a gradation value for each stage which is a predetermined range in the transport direction of the amount of displacement detecting chart determined, obtains an approximate curve of an even function based on each dispersion value, and determines the peak position based on the approximate curve (Claim 6).

Since the peak position is obtained after obtaining an approximate curve from the dispersion values, the peak position can be determined with higher accuracy than determining the peak position from an approximate curve obtained from average values or the like. Further, an amount of displacement can be obtained with high accuracy since it is possible to obtain a peak position existing between the stages which are discrete values.

The amount of displacement calculating method defined in claim 7 is an amount of displacement calculating method for correcting a misregister in which a printing position is displaced in a transport direction of a printing medium, comprising a testing chart printing step for printing a testing chart on the printing medium, the testing chart including a first detecting chart for detecting a direction of displacement of a recording position in the transport direction relative to a reference print head, by means of the reference print head and a print head spaced in the transport direction from the reference print head, the reference print head being a print head selected from a plurality of print heads arranged at intervals in the transport direction of the printing medium to serve as reference for recording positions of the plurality of print heads; and a second detecting chart formed of a plurality of amount of displacement detecting charts including an amount of displacement detecting chart having a peak position corresponding to a maximum or a minimum of density and moving in response to amounts of displacement in order to detect an amount of displacement of the recording position in the transport direction relative to the reference print head, and the amount of displacement detecting chart printed with drawing positions by the print head in the amount of displacement detecting chart shifted in the transport direction by predetermined shift amounts corresponding to the integral multiples of a maximum amount of displacement detectable with the amount of displacement detecting chart; a scanning step for scanning the testing chart to acquire testing image data; a direction of displacement detecting step for discriminating the first detecting chart from the testing image data, and detecting a direction of displacement in the transport direction of the recording position; an amount of displacement detecting chart determining step for discriminating the second detecting chart from the testing image data, and determining one having the peak position closest to a middle position of the amount of displacement detecting chart out of the plurality of amount of displacement detecting charts; and a total amount of displacement calculating step for calculating the amount of displacement of the recording position as a total amount of displacement based on the direction of displacement detected, the shift amount of the amount of displacement detecting chart determined, and the amount of displacement corresponding to the peak position of the amount of displacement detecting chart determined.

[Functions and effects] According to the invention defined in claim 7, testing image data is acquired by scanning in the scanning step the testing chart printed in the testing chart printing step. The total amount of displacement calculating step calculates an amount of displacement of a recording position including the direction of displacement as a total amount of displacement, based on a direction of displacement detected in the direction of displacement detecting step, a shift amount corresponding to an amount of displacement detecting chart determined in the amount of displacement detecting chart determining step, and a peak position of the amount of displacement detecting chart determined in the amount of displacement detecting chart determining step. Therefore, since the total amount of displacement of the misregister can be calculated only by printing the testing chart on the printing medium, the amount of displacement of the misregister in the transport direction can be obtained easily in a short time.

In this invention, it is preferred that the amount of displacement detecting chart includes a plurality of baselines formed by the reference print head at constant intervals in a direction perpendicular to the transport direction; and a plurality of displacement lines printed by a print head spaced in the transport direction from the reference print head, to be parallel to the plurality of baselines and in middles between the baselines or in a middle of the baselines, the plurality of displacement lines being printed with deviations from baselines adjacent the middle baseline, which deviations increase progressively from the baseline in the middle of the plurality of baselines toward the baselines formed at ends in the transport direction (Claim 8).

When no misregister has occurred in the transport direction and when the displacement lines are printed in the middles between the baselines, it will become darkest in density difference since all of the baselines and displacement lines are exposed in the center of the plurality of baselines. When the displacement lines are printed in the middles between the baselines, it will become brightest in density difference since the baselines and displacement lines completely overlap one another in the center of the plurality of baselines. When a misregister has occurred in the transport direction, the displacement lines will have moved relative to the baselines according to the extent of the misregister in the transport direction. This will result in a change in density difference, whereby a peak position of a dark pattern or a peak position of a bright pattern moves in the transport direction from the center of the plurality of baselines. Thus, acceleration of the scanning step can be achieved.

The testing chart defined in claim 10 is a testing chart for testing a misregister having a printing position displaced in a transport direction of a printing medium, comprising a first detecting chart for detecting a direction of displacement of a recording position in the transport direction relative to a reference print head, the reference print head being a print head selected from a plurality of print heads arranged at intervals in the transport direction to serve as reference for recording positions of the plurality of print heads; and a second detecting chart formed of a plurality of amount of displacement detecting charts including an amount of displacement detecting chart having a peak position corresponding to a maximum or a minimum of density and moving in response to amounts of displacement in order to detect an amount of displacement of the recording position in the transport direction relative to the reference print head, and the amount of displacement detecting chart printed with drawing positions by the print head in the amount of displacement detecting chart shifted in the transport direction by predetermined shift amounts corresponding to the integral multiples of a maximum amount of displacement detectable with the amount of displacement detecting chart.

[Functions and effects] According to the invention defined in claim 10, when testing image data is acquired by scanning the testing chart, it is possible to obtain a direction of displacement from the first testing chart, a shift amount corresponding to the amount of displacement detecting chart of the second detecting chart, and an amount of displacement corresponding to a peak position of the amount of displacement detecting chart of the second detecting chart. Based on these values, therefore, an amount of displacement of the recording position including the direction of the misregister can be calculated as a total amount of displacement. As a result, since the total amount of displacement of the misregister can be calculated only by printing the testing chart on the printing medium, the amount of displacement of the misregister in the transport direction can be obtained easily in a short time.

In this invention, it is preferred that the amount of displacement detecting chart includes a plurality of baselines formed by the reference print head at constant intervals in a direction perpendicular to the transport direction; and a plurality of displacement lines printed by a print head spaced in the transport direction from the reference print head, to be parallel to the plurality of baselines and in middles between the baselines or in a middle of the baselines, the plurality of displacement lines being printed with deviations from baselines adjacent the middle baseline, which deviations increase progressively from the baseline in the middle of the plurality of baselines toward the baselines formed at ends in the transport direction (Claim 11).

When no misregister has occurred in the transport direction and when the displacement lines are printed in the middles between the baselines, it will become darkest in density difference since all of the baselines and displacement lines are exposed in the center of the plurality of baselines. When the displacement lines are printed in the middles between the baselines, it will become brightest in density difference since the baselines and displacement lines completely overlap one another in the center of the plurality of baselines. When a misregister has occurred in the transport direction, the displacement lines will have moved relative to the baselines according to the extent of the misregister in the transport direction. This will result in a change in density difference, whereby a peak position of a dark pattern or a peak position of a bright pattern moves in the transport direction from the center of the plurality of baselines. Thus, scanning can be done at high speed.

Advantageous Effects of Invention

According to the printing apparatus of this invention, testing image data is acquired by scanning with the tester the testing chart printed by the printing control device. The total amount of displacement calculating device calculates an amount of displacement of a recording position including the direction of displacement as a total amount of displacement, based on a direction of displacement detected by the direction of displacement detecting device, a shift amount corresponding to an amount of displacement detecting chart determined by the amount of displacement detecting chart determining device, and a peak position of the amount of displacement detecting chart determined by the amount of displacement detecting chart determining device. Therefore, since the total amount of displacement of the misregister can be calculated only by printing the testing chart on the printing medium, the amount of displacement of the misregister in the transport direction can be obtained easily in a short time.

With the plurality of amount of displacement detecting charts of the second detecting chart of the testing chart, the periodicity of the amount of displacement detecting charts may cause the shift amount and peak position of the amount of displacement detecting charts to become similar even when a misregister occurs in the opposite direction. However, the direction of displacement detected with the first detecting chart can prevent an erroneous determination indicating the opposite direction. While a detectable amount of displacement is small where only one amount of displacement detecting chart is used, increased amounts of displacement can be calculated since the second detecting chart includes the amount of displacement detecting charts with varied shift amounts.

BRIEF DESCRIPTION OF THE DRAWINGS

FIG. 13($a$) is a schematic view of scan image data of the amount of displacement detecting chart, and ($b$) is a schematic view showing one example of dispersion values calculated from the scan image data; and FIG. 14 is a view illustrating obtaining of a vertex of a quadratic function and calculating values between discrete values.

DESCRIPTION OF EMBODIMENTS

One embodiment of this invention will be described hereinafter with reference to the drawings.

Figure 1:
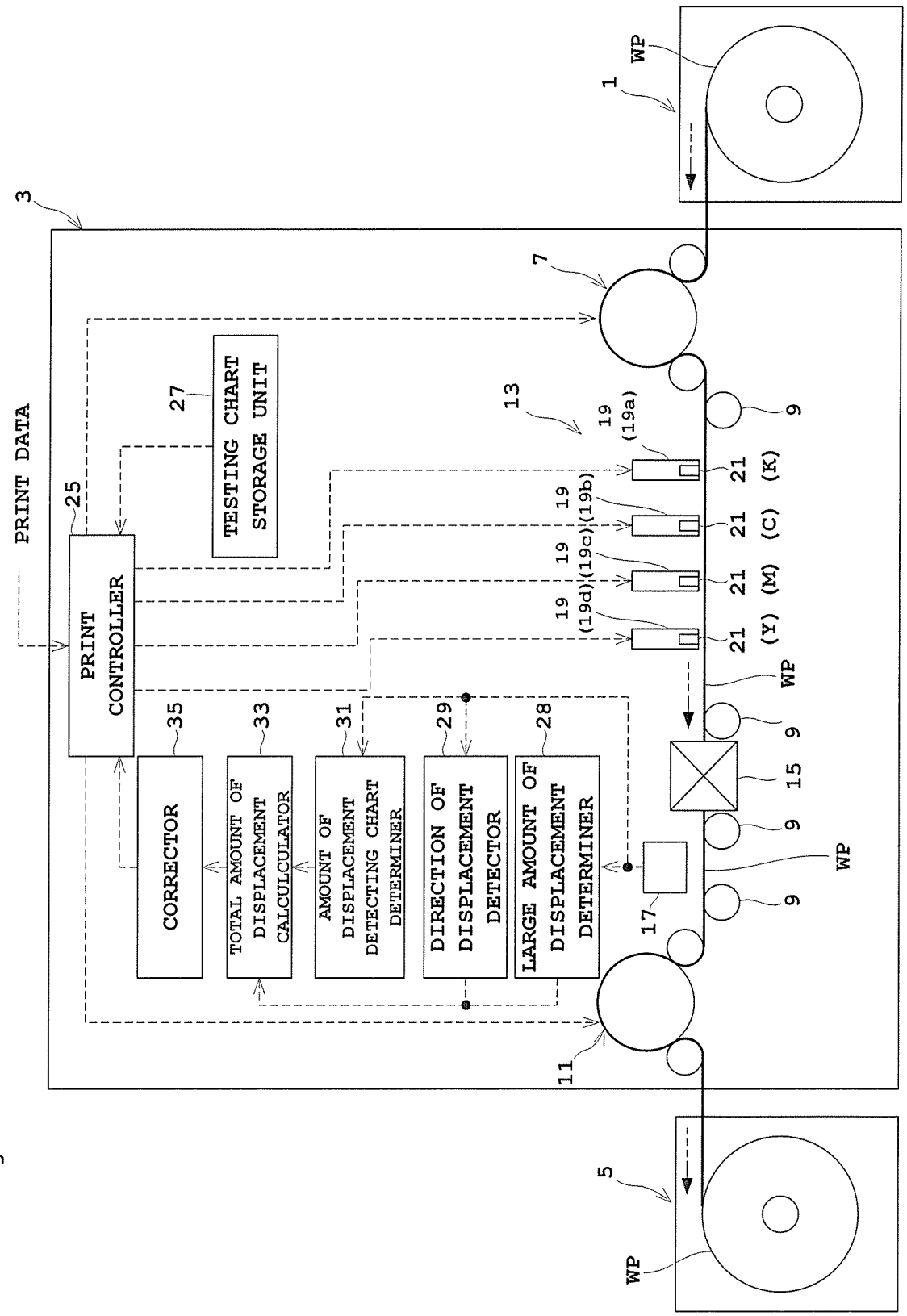
FIG. 1 is an outline schematic view showing an entire inkjet printing system according to an embodiment.
Figure 2:
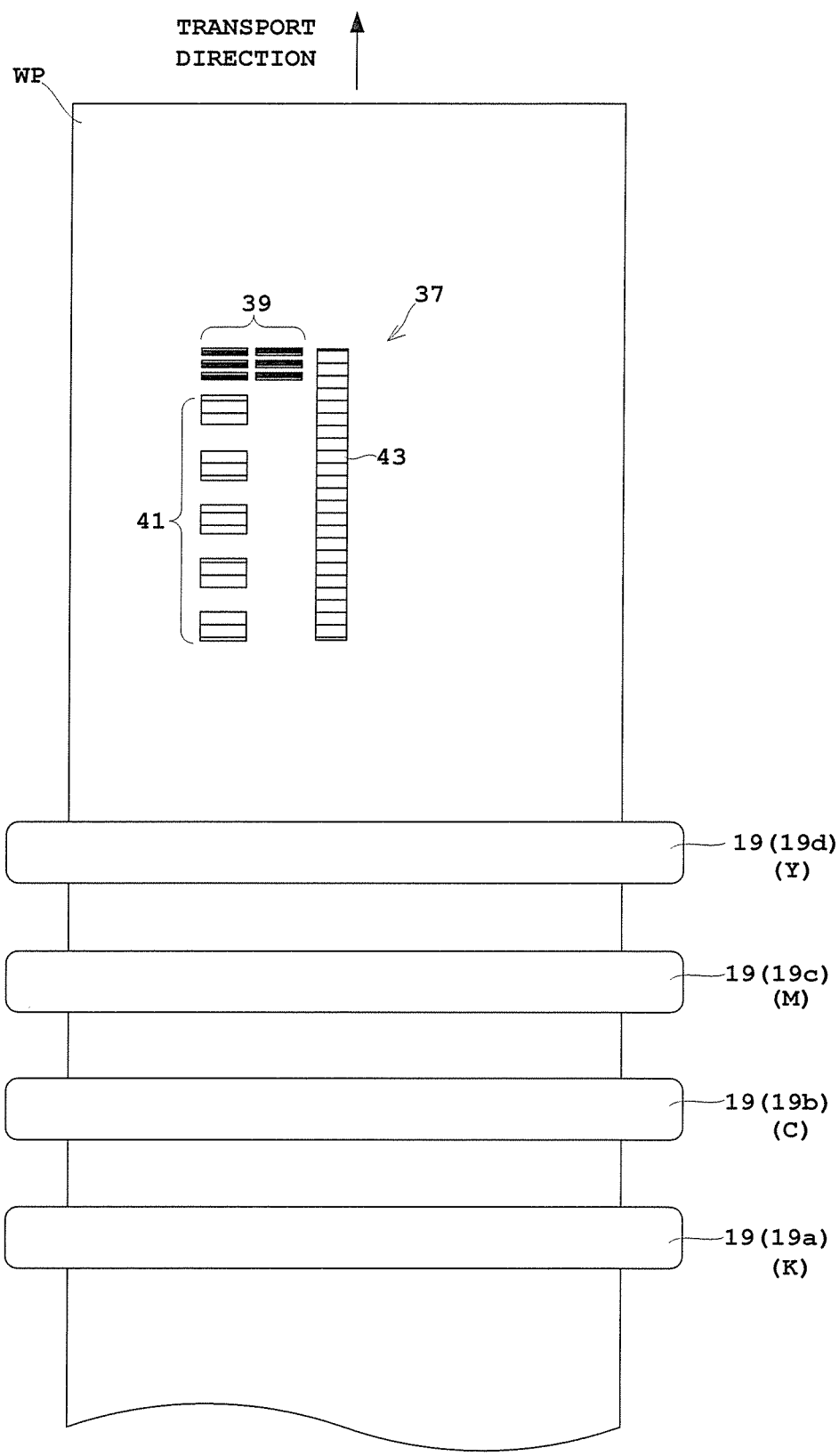
FIG. 2 is a schematic view showing a positional relationship in plan view of web paper and each print head.

FIG. 1 is an outline schematic view showing an entire inkjet printing system according to the embodiment. FIG. 2 is a schematic view showing a positional relationship in plan view of web paper and each print head.

The ink jet printing system according to this embodiment includes a paper feeder 1, an inkjet printing apparatus 3 and a takeup roller 5.

The paper feeder 1 holds web paper WP in a roll form to be rotatable about a horizontal axis, and unwinds and feeds the web paper WP to the inkjet printing apparatus 3. The takeup roller 5 takes up on a horizontal axis the web paper WP printed in the inkjet printing apparatus 3. Referring to the side of feeding the web paper WP as upstream and that of discharging the web paper WP as downstream, the paper feeder 1 is located upstream of the inkjet printing apparatus 3, and the takeup roller 5 downstream of the inkjet printing apparatus.

The inkjet printing apparatus 3 includes a drive roller 7 disposed in an upstream position for taking in the web paper WP from the paper feeder 1. The web paper WP unwound from the paper feeder 1 by the drive roller 7 is transported downstream along a plurality of transport rollers 9 toward the takeup roller 5. A drive roller 11 is disposed between the most downstream transport roller 9 and the takeup roller 5. This drive roller 11 feeds the web paper WP transported on the transport rollers 9 forward toward the takeup roller 5.

The above inkjet printing apparatus 3 corresponds to the "printing apparatus" in this invention. The web paper WP corresponds to the "printing medium" in this invention.

The inkjet printing apparatus 3 has a printing unit 13, a dryer 15 and a tester 17 arranged in the stated order from upstream between the drive roller 7 and drive roller 11. The dryer 15 dries portions printed by the printing unit 13. The tester 17 checks whether the printed portions of the web paper WP have stains, omissions or other defects, and scans a testing chart, which will be described hereinafter, to acquire testing image data.

The above tester 17 corresponds to the "scanning device" in this invention.

The printing unit 13 has a plurality of print heads 19 for discharging ink droplets. This embodiment will be described taking a construction having four print heads 19 for example. Here, the print heads 19 will be labeled print head 19*a*, print head 19*b*, print head 19*c* and print head 19*d* in order from upstream. In this specification, when the print heads 19 need to be distinguished, an additional sign (such as "a") will be written after sign 19, but when it is not necessary to distinguish them, only sign 19 will be used. Each print head 19 has a plurality of inkjet nozzles 21 for discharging ink droplets. The plurality of inkjet nozzles 21 are arranged to form a line in a direction perpendicular to the transport direction of the web paper WP. These print heads 19*a*-19*d* discharge ink droplets of at least two colors, and are arranged capable of making multicolor printing on the web paper WP. Here, the print head 19*a* discharges black (K) ink, for example, the print head 19*b* discharges cyan (C) ink, print head 19*c* discharges magenta (M) ink, and print head 19*d* discharges yellow (Y) ink. The print heads 19*a*-19*d* are arranged at predetermined intervals in the transport direction.

The inkjet printing apparatus 3 includes a CPU and memory, not shown, which constitute a printing controller 25, a testing chart storage unit 27, a large amount of displacement determiner 28, a direction of displacement detector 29, an amount of displacement detecting chart determiner 31, a total amount of displacement calculator 33, and a corrector 35.

The printing controller 25 receives print data for prints including images, characters and so on from a host computer not shown, and operates the components such as the drive roller 7 described hereinbefore to carry out printing on the web paper WP based on the print data. The printing controller 25 also reads the testing chart (described in detail hereinafter) stored beforehand in the testing chart storage unit 27, operates the components such as the above drive roller 7 to print the testing chart on the web paper WP, and carries out printing while making correction based on displacement correction data described hereinafter.

The above printing controller 25 corresponds to the "printing control device" in this invention.

A testing chart 37 is as shown in FIG. 2, for example. This testing chart 37 is intended for testing an amount of displacement for correcting a misregister of the print head 19*d*, for example, with reference to the print head 19*a* located in the most upstream position. Specifically, it includes a first detecting chart 39, a second detecting chart 41, and a third detecting chart 43. For correcting misregisters of the print heads 19*b* and 19*c*, the following testing chart 37 may be printed with the print heads 19*b* and 19*c*.

The above print head 19*a* corresponds to the "reference print head" in this invention.

Figure 3:
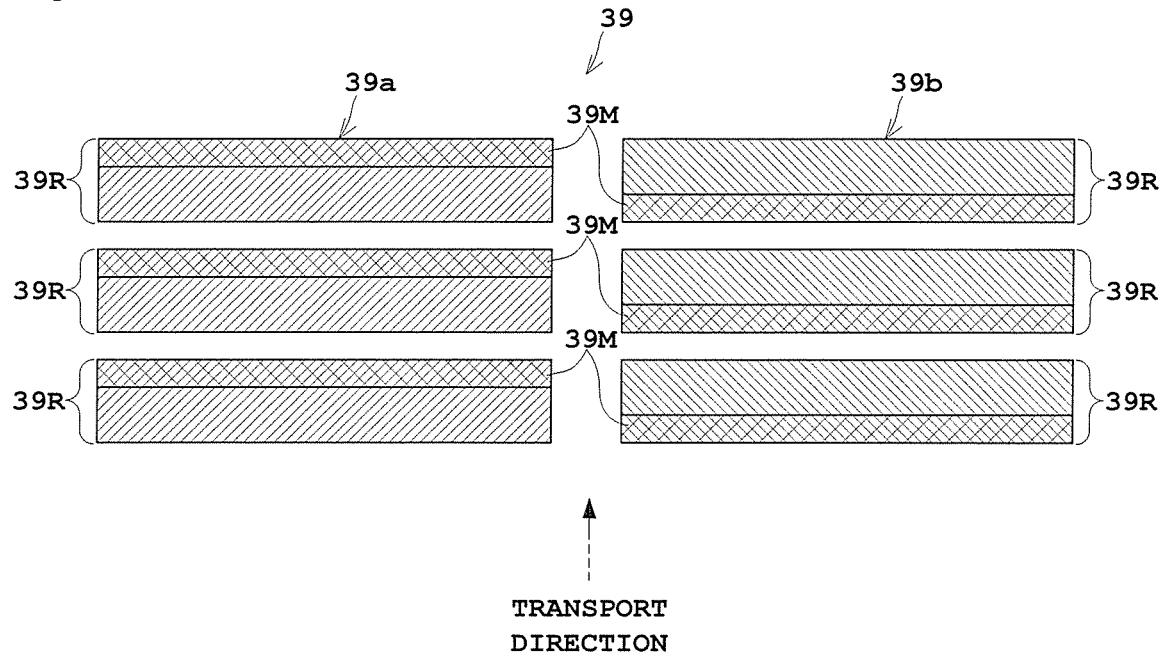
FIG. 3 is a schematic view showing an example of first detecting chart.
Figure 4:
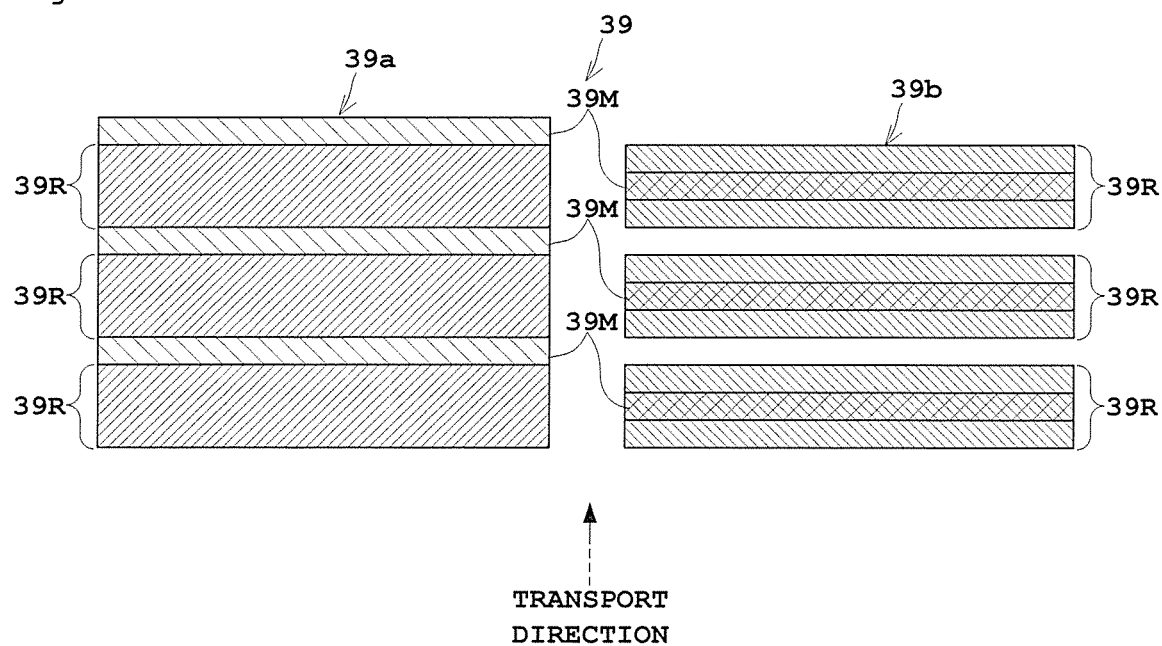
FIG. 4 is a schematic view showing the first detecting chart in a displaced state.

The first detecting chart 39 will now be described with reference to FIGS. 3 and 4. FIG. 3 is a schematic view showing an example of the first detecting chart. FIG. 4 is a schematic view showing the first detecting chart in a displaced state.

The first detecting chart 39 has upper detecting charts 39*a* and lower detecting charts 39*b*. The upper detecting charts 39*a* are formed of reference line segments 39R printed by the print head 19*a* to extend perpendicular to the transport direction, and moving line segments 39M printed by the print head 19*d*. Although three reference line segments 39R and three moving line segments 39M are printed here, respectively, they may be in any number, e.g. two or more. The reference line segments 39R have a predetermined length in the direction perpendicular to the transport direction, and have a predetermined width in the transport direction. The moving line segments 39M have a smaller width in the transport direction than the reference line segments 39R, and are printed to overlap, in close contact from above (on upstream side) with, the reference line segments 39R, and fit within the width of the reference line segments 39R.

The lower detecting charts 39*b*, as are the upper detecting charts 39*a*, are formed of reference line segments 39R printed by the print head 19*a* to extend perpendicular to the transport direction, and moving line segments 39M printed by the print head 19*d*. However, there is a difference from the upper detecting charts 39*b* in that the moving line segments 39M are printed to overlap, in close contact from below (on downstream side) with, the reference line segments 39M, and fit within the width of the reference line segments 39R.

When, for example, the print head 19*d* has printed with early timing with respect to the print head 19*a* acting as the reference, the first detecting chart 39 will be printed in a displaced state as shown in FIG. 4. That is, the upper detecting charts 39*a* will have the moving line segments 39M printed to exceed the width of the reference line segments 39R. On the other hand, the lower detecting charts 39*b* will have the moving line segments 39M moved within the width of the reference line segments 39R. As a result, the upper detecting charts 39*a* have higher density than the lower detecting charts 39*b*, and based on the density of the first detecting chart 39, the direction of displacement can be determined upward.

Although the second detecting chart 41 described hereinafter may fail to enable determination of a direction of amount of displacement due to periodicity of the amount of displacement and density variation, the first detecting chart 39 enables accurate determination of a direction of displacement.

Figure 5:
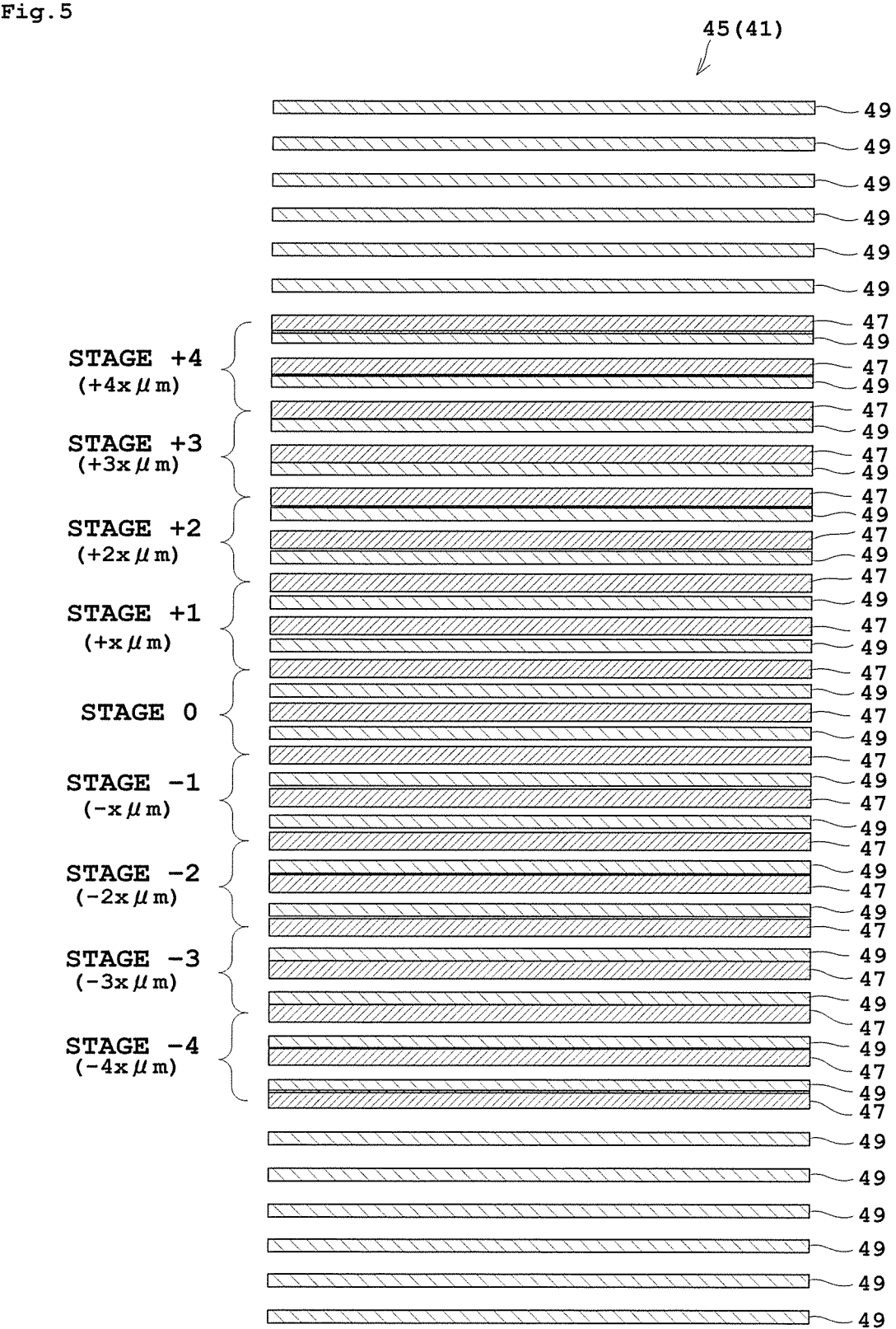
FIG. 5 is a schematic view showing one example of amount displacement detecting charts constituting a second detecting chart.
Figure 6:
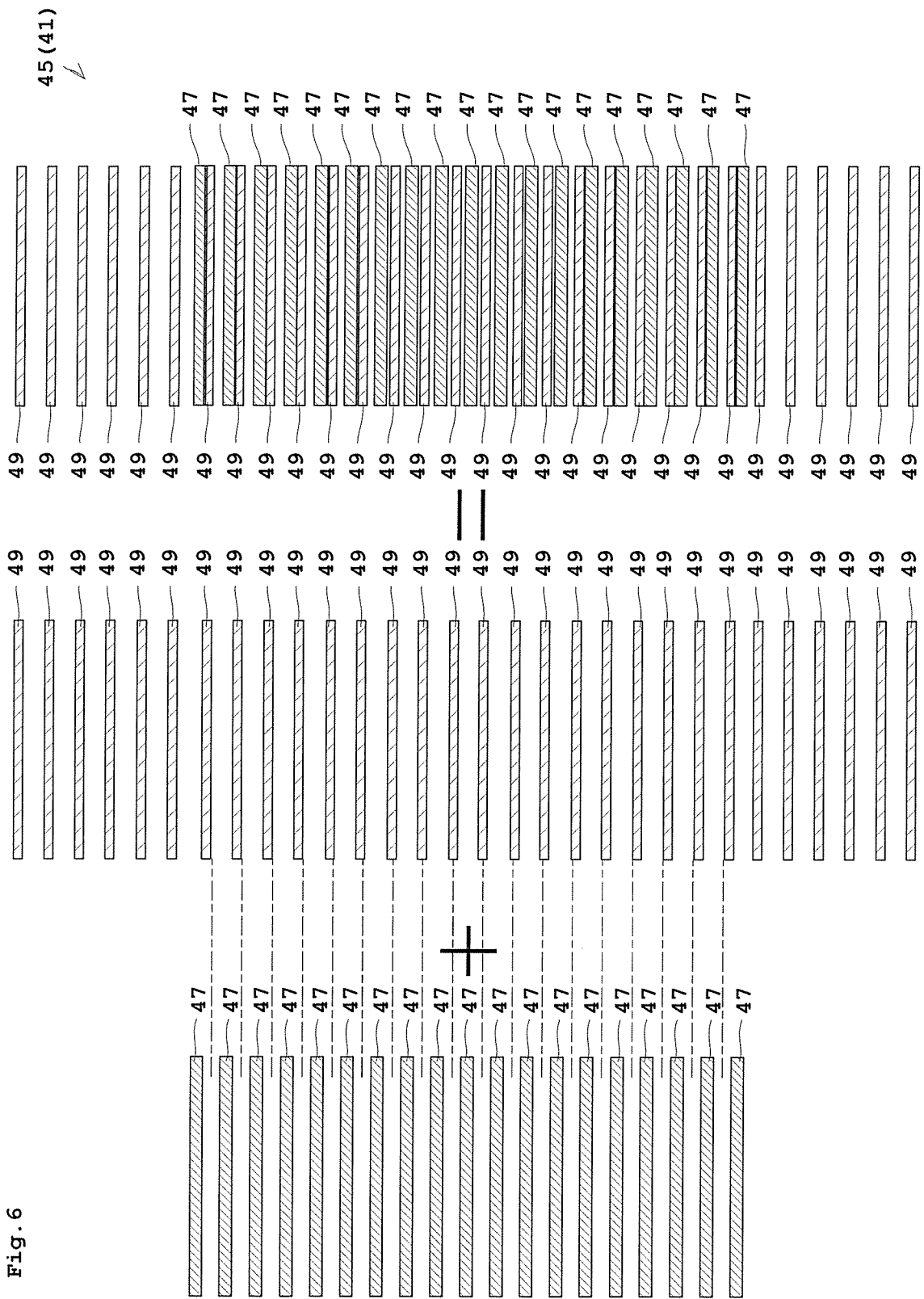
FIG. 6 is a schematic view showing a construction of the one amount of displacement detecting chart.

Next, the second detecting chart 41 will be described with reference to FIGS. 5 and 6. FIG. 5 is a schematic view showing one example of amount of displacement detecting charts constituting the second detecting chart. FIG. 6 is a schematic view showing the construction of the one amount of displacement detecting chart.

The second detecting chart 41 includes a plurality of prints of the amount of displacement detecting chart 45 shown in FIG. 5. The amount of displacement detecting chart 45, as shown in FIG. 6, for example, has 19 baselines 47 printed by the print head 19*a* acting as the reference, as arranged at constant intervals in the direction perpendicular to the transport direction, and 30 displacement lines 49 printed by the print head 19*d* to be arranged in middles between the 19 baselines 47. The 30 displacement lines 49 are printed with deviations from baselines 47 adjacent the middle baseline 47, which deviations increase progressively from the middle baseline 47 toward the baselines 47 printed at opposite ends in the transport direction. Thus, when the amount of displacement is 0, as shown in FIG. 5, there occurs the least exposure of the base of web paper WP in stage 0 which corresponds to the middle of the second detecting chart 41. This makes stage 0 of the second detecting chart 41 a maximum in density (highest density or darkest). And with an increase in the amount of displacement, the displacement lines 49 shift relative to the baselines 47, a peak position with maximum density (i.e. darkest) will move toward the end in response to the deviations set beforehand. Although six displacement lines 49 are arranged out of the baselines 47 in each of the upward and downward directions, the baselines 47 may conversely be arranged out of the displacement lines 49 in the upward and downward directions. By arranging one group of lines out of the other group, it is possible to avoid an inconvenience of failing to detect density in the case of a large misregister.

In the amount of displacement detecting chart 45 of the second detecting chart 41, as shown in FIG. 5, two displacement lines 49 form one set to provide one stage, for example. That is, printing is carried out with the above-mentioned deviation varied for every two displacement lines 49. Each stage in the second detecting chart 41, on an assumption of middle stage 0 being 0 µm, represents an amount of displacement of x$\mu$m (e.g. 21 µm) from stage 0. That is, stage+1 represents an amount of displacement of x$\mu$m (e.g. 21 µm), stage+2 represents an amount of displacement of 2 x$\mu$m (e.g. 42 µm), stage+3 represents an amount of displacement of 3 x$\mu$m (e.g. 63 µm), and stage+4 represents an amount of displacement of 4 x$\mu$m (e.g. 84 µm). Similarly, stage−1 represents an amount of displacement of −x$\mu$m (e.g. −21 µm), stage−2 represents an amount of displacement of −2 x$\mu$m (e.g. −42 µm), stage−3 represents an amount of displacement of −3 x$\mu$m (e.g. −63 µm), and stage−4 represents an amount of displacement of −4 x$\mu$m (e.g. −84 µm). The amounts of displacement represented by the respective stages are determined based, for example, on the width in the transport direction of the 19 baselines 47, the intervals between the baselines 47, and the width and deviations in the transport direction of 18 displacement lines 49. A correspondence relationship between these amounts of displacement and the respective stages is stored beforehand in the testing chart storage unit 27, which is referred to, as necessary, by the amount of displacement detecting chart determiner 31 and total amount of displacement calculator 33.

Figure 7:
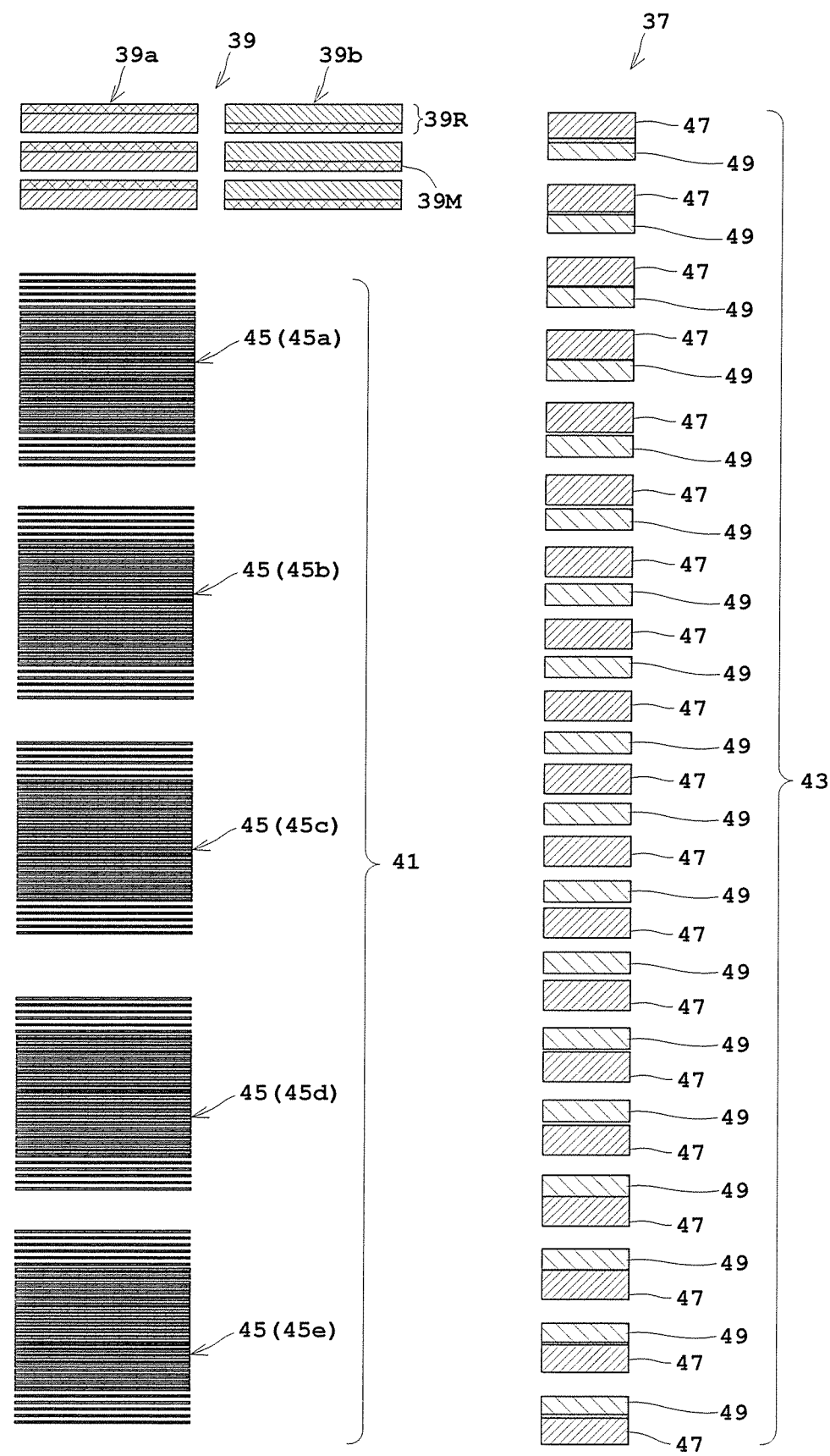
FIG. 7 is a schematic view of a testing chart including the first to third detecting charts.

Reference is now made to FIG. 7. FIG. 7 is a schematic view of the testing chart including the first to third detecting charts.

Although the second detecting chart 41 is formed as described above, when an amount of displacement exceeds the maximum amount of displacement (4 x$\mu$m) that can be detected by the amount of displacement detecting chart 45, the amount of displacement exceeding the maximum amount of displacement cannot be obtained with one amount of displacement detecting chart 45 because the peak position is fixed to stage+4. So, in order to enlarge the detectable range of amounts of displacement, the second detecting chart 41 is formed, for example, by printing the four amount of displacement detecting charts 45 besides the above-described amount of displacement detecting chart 45. Here, the above-described amount of displacement detecting chart 45 is affixed with sign 45a, and the other four affixed with signs 45b-45e, respectively.

The amount of displacement detecting charts 45b-45e are formed each by shifting the displacement lines 49 in the amount of displacement detecting chart 45a by a shift amount to one side in the transport direction. The shift amounts are, for example, integral multiples of the maximum amount of displacement (4 x$\mu$m) detectable with the amount pf displacement detecting chart 45a. Specifically, the amount of displacement detecting chart 45b is formed by a shift of 1×4 x$\mu$m (e.g. 84 µm), the amount of displacement detecting chart 45c by 2×4 x$\mu$m (e.g. 168 µm), the amount of displacement detecting chart 45d by 3×4 x$\mu$m (e.g. 252 µm), and the amount of displacement detecting chart 45e by 4×4 x$\mu$m (e.g. 336 µm). The second detecting chart 41 consisting of the five amount of displacement detecting charts 45a-45e with the displacement lines 49 shifted by these shift amounts can obtain an amount of displacement by determining one of the amount of displacement detecting charts 45 having the peak position closest to the middle, and then determining an amount of displacement in stage correspondence in that amount of displacement detecting chart 45. The correspondence relationship between these amount of displacement detecting charts 45a-45e and the shift amounts is stored beforehand in the testing chart storage unit 27, which is referred to, as necessary, by the amount of displacement detecting chart determiner 31 and total amount of displacement calculator 33.

As shown in FIG. 7, the third detecting chart 43 is printed with the second detecting chart 45 (45a) enlarged in the transport direction. However, in order to lessen the printing width in the direction perpendicular to the transport direction, the length in the direction perpendicular to the transport direction of the baselines 47 and displacement lines 49 is set shorter than the length in the second detecting chart 41. The above enlargement factor is 16, for example. This can obtain an amount of displacement up to 16 times (16×4 x$\mu$m, e.g. 1344 µm) the maximum amount of displacement (4 x$\mu$m) detectable with the second detecting chart 45. The correspondence relationship between each stage of the third detecting chart 43 and the large amount of displacement is stored beforehand in the testing chart storage unit 27.

It is difficult to discriminate density difference since the third detecting chart 43 constructed as described above is enlarged in the transport direction. So, it is desirable to binarize the third detecting chart 43, measure the intervals between the baselines 47 and displacement lines 49 and the number thereof, and determine a stage in the third detecting chart 43 based on a location with the largest number of intervals, and with such intervals occurring most evenly. This is because the largest number of intervals and the most even occurrence of the intervals mean the smallest area of appearance for the base of the web paper WP, and this can be determined a peak position of high density.

Figure 8:
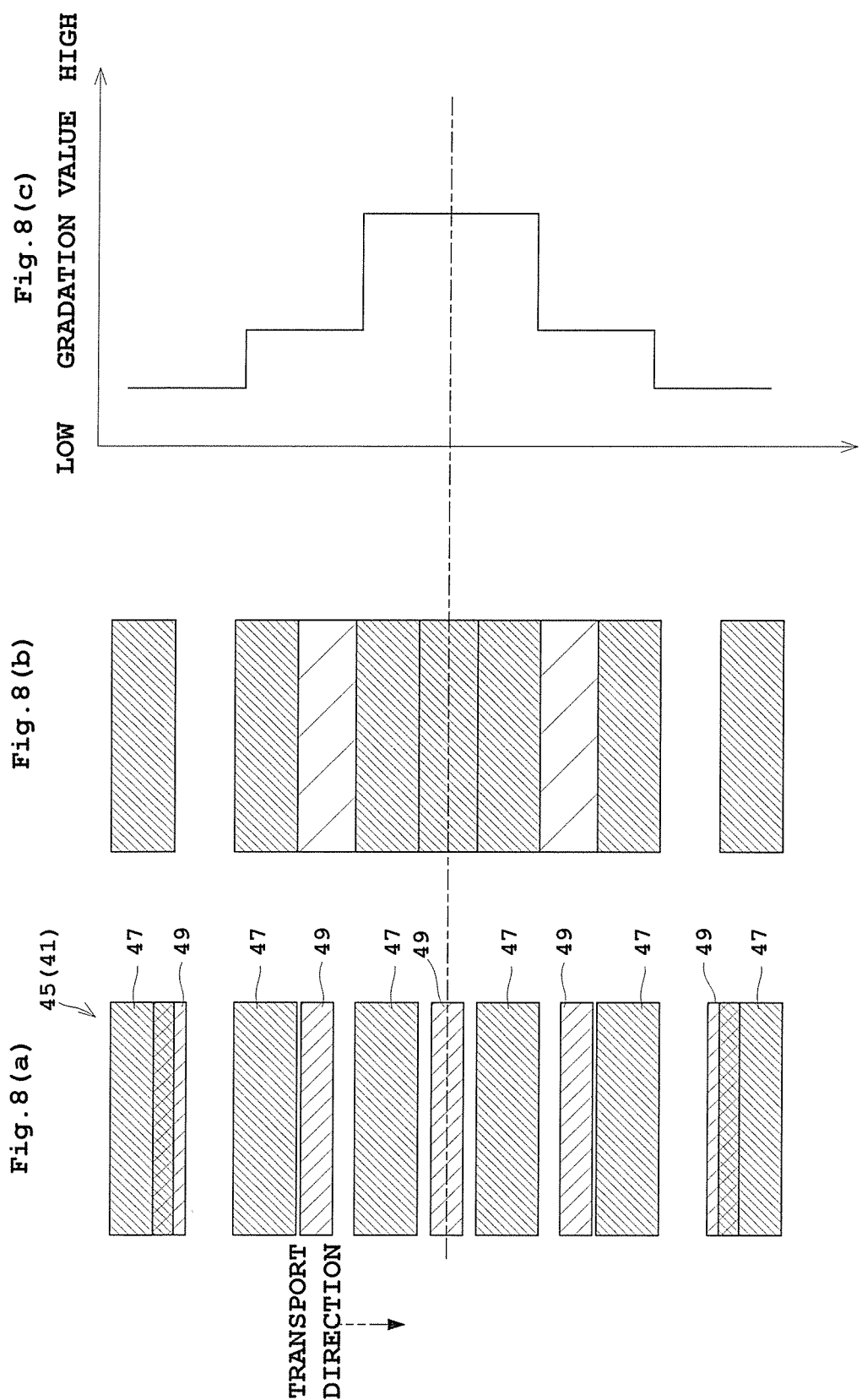
FIG. 8 is a schematic view showing a state with no misregister, in which (a) is the amount of displacement detecting chart, (b) is detecting image data, and (c) is a distribution concerning gradation values of the detecting image data.
Figure 9:
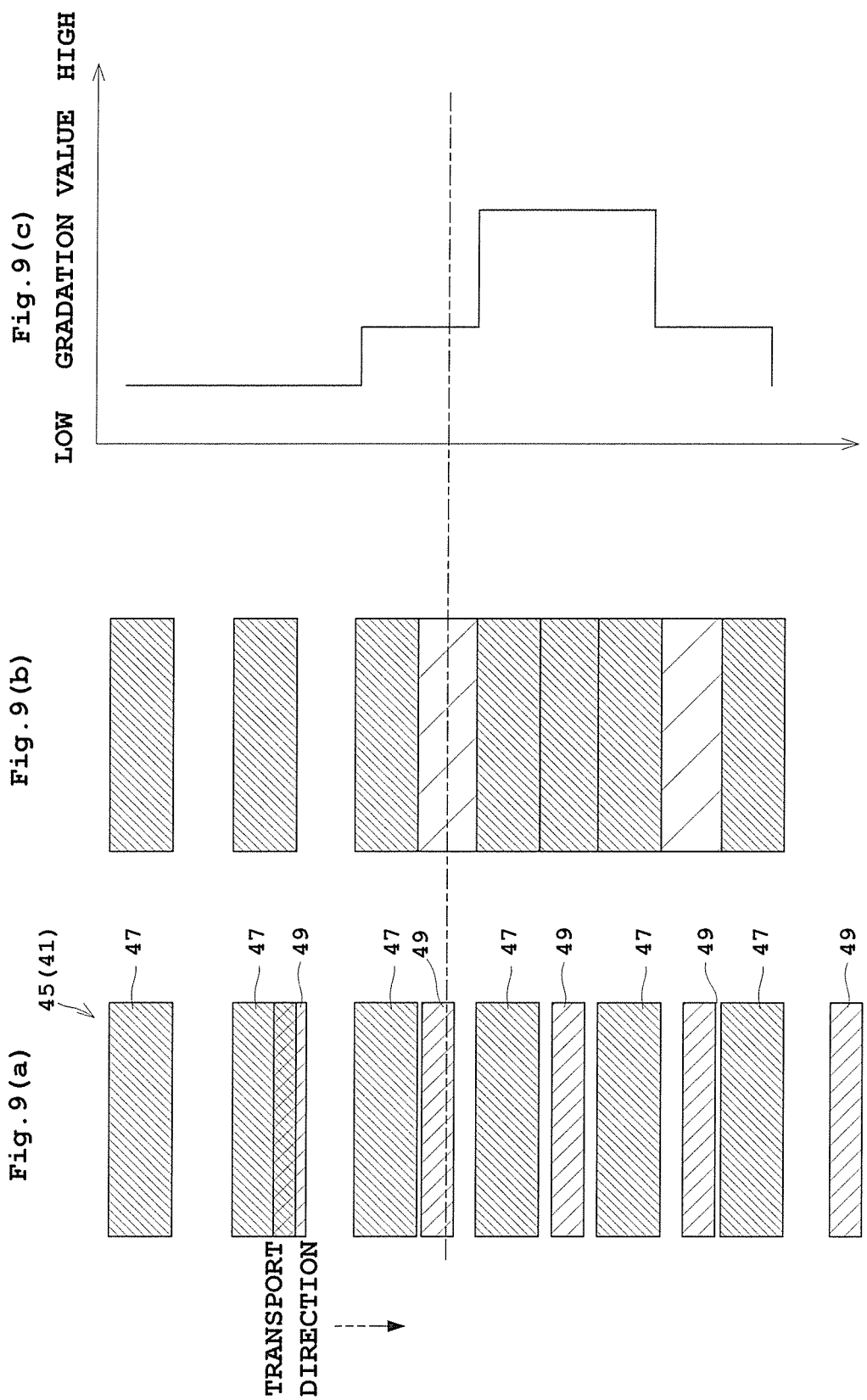
FIG. 9 is a schematic view showing a state with a misregister, in which (a) is the amount of displacement detecting chart, (b) is detecting image data, and (c) is a distribution concerning gradation values of the detecting image data.

Reference is now made to FIGS. 8 and 9. FIG. 8 is a schematic view showing a state with no misregister, in which (a) is the amount of displacement detecting chart, (b) is detecting image data, and (c) is a distribution concerning gradation values of the detecting image data. FIG. 9 is a schematic view showing a state with a misregister, in which (a) is the amount of displacement detecting chart, (b) is detecting image data, and (c) is a distribution concerning gradation values of the detecting image data.

When there is no misregister, a displacement line 49 is located at the middle between baselines 47. A distribution of gradation values (FIG. 8(c)) of detecting image data (FIG. 8(b)) obtained by scanning the amount of displacement chart 45 (FIG. 8(a)) has a peak value at the middle thereof.

That is, since the amount of displacement is zero, the displacement line 49 fits between the baselines 47 in the middle of the amount of displacement detecting chart 45. Therefore, exposure of the base (assumed here to be white) of the web paper WP becomes least, and the density (gradation value) shows a peak in the middle of the amount of displacement detecting chart 45. Since the area in which the displacement lines 49 overlap the baselines 47 increases from the middle toward ends, exposure of the base increases correspondingly and the gradation values become lower toward the ends.

When a misregister has occurred, on the other hand, the displacement lines 49 will move relative to the baselines 47 in accordance with an amount of displacement of the misregister, and their fitting places also move in the transport direction. Therefore, the position of the peak value of the gradation values in the distribution (FIG. 9(c)) of the gradation values of the detecting image data (FIG. 9(b)) obtained by scanning the amount of displacement detecting chart 45 (FIG. 9(a)) moves according to the amount of displacement. It will be seen that an amount of displacement from the middle can be calculated by reading the position of the peak value based on these.

Reference is now made back to FIG. 1.

The large amount of displacement determiner 28 receives the testing image data of the testing chart 37 obtained through scanning by the tester 17. Then, the large amount of displacement determiner 28 determines a large amount of displacement based on the portion of the testing image data corresponding to the third detecting chart 43.

The direction of displacement detector 29 detects a direction of displacement of a recording position based on the portion of the testing image data corresponding to the first testing chart 39.

The amount of displacement detecting chart determiner 31 first determines one having a peak position close to the middle from among the five amount of displacement detecting charts 45a-45e based on the portion of the testing image data corresponding to the second testing chart 41. Subsequently, it determines a shift amount corresponding to the amount of displacement detecting chart 45 determined, and an amount of displacement of the stage corresponding to the peak position of the amount of displacement detecting chart 45 determined.

The total amount of displacement calculator 33 calculates a total amount of displacement by adding the large amount of displacement determined by the large amount of displacement determiner 28, and the shift amount and amount of displacement determined by the amount of displacement detecting chart determiner 31. The total amount of displacement calculator 33 also obtains a direction of displacement corresponding to positive or negative of the total amount of displacement from the direction of displacement detector 29.

The corrector 35 creates displacement correction data for correcting a misregister based on the total amount of displacement calculated by the total amount of displacement calculator 33. This displacement correction data is given to the printing controller 25, and is used for printing with the misregister suppressed through a control which considers the displacement correction data in connection with a difference in printing based on print data (e.g. which regulates timing of printing by each of the print heads 9a-10d).

The above large amount of displacement determiner 28 corresponds to the "large amount of displacement determining device" in this invention. The direction of displacement detector 29 corresponds to the "direction of displacement detecting device" in this invention. The amount of displacement detecting chart determiner 31 corresponds to the "amount of displacement detecting chart determining device" in this invention. The total amount of displacement calculator 33 corresponds to the "total amount of displacement calculating device" in this invention. The corrector 35 and printing controller 25 correspond to the "correcting device" in this invention.

Figure 10:
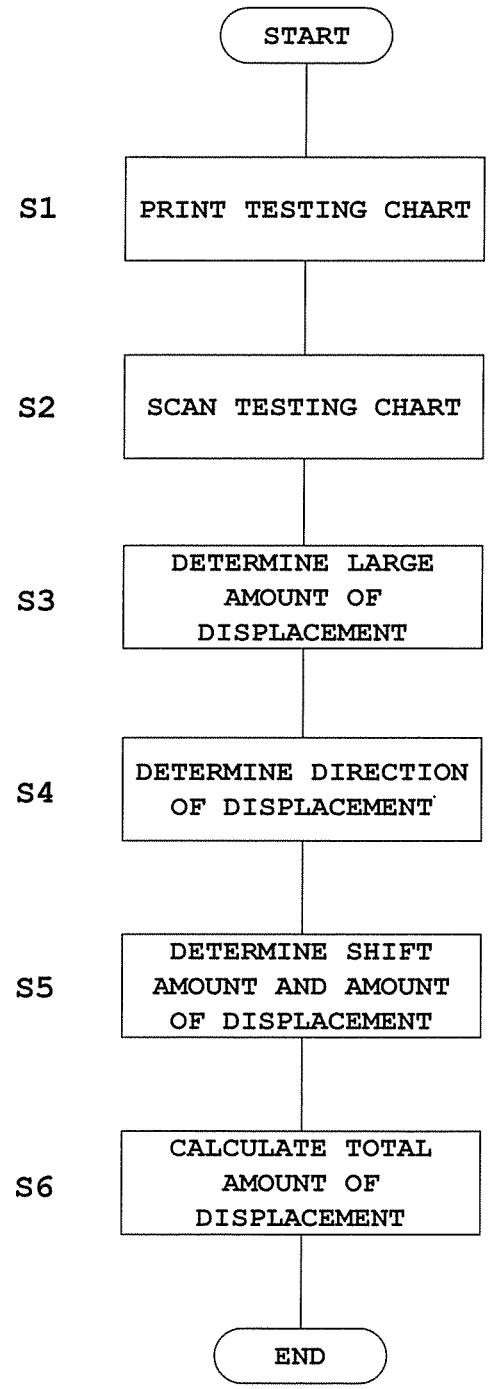
FIG. 10 is a flow chart showing an amount of displacement calculating process.

Next, reference is made to FIG. 10. FIG. 10 is a flow chart showing an amount of displacement calculating process. This flow chart shows a process up to calculation of the total amount of displacement, and does not show the correction.

Step S1 (Testing Chart Forming Step)

The printing controller 25 reads data of the testing chart 37 from the testing chart storage unit 27, and causes the testing chart 37 to be printed on the web paper WP by operating the print heads 19a-19d, drive rollers 7 and 11, and so on.

Step S2 (Scanning Step)

When an area forming the testing chart 37 of the web paper WP has moved to the tester 17, the tester 17 scans the area to acquire the testing image data from the testing chart 37.

Step S3

The large amount of displacement determiner 28 determines a large amount of displacement based on the third detecting chart 43 included in the testing image data.

Step S4 (Direction of Displacement Detecting Step)

The direction of displacement detector 29 detects a direction in which a misregister has occurred based on the second detecting chart 41 in the test image data.

Step S5 (Amount of Displacement Detecting Chart Determining Step)

The amount of displacement detecting chart determiner 31 determines a shift amount and an amount of displacement based on the five amount of displacement detecting charts 45a-45e included in the second detecting chart 41.

Step S6 (Total Amount of Displacement Calculating Step)

The total amount of displacement calculator 33 calculates an amount of displacement of the recording position as a total amount of displacement based on the large amount of displacement from the large amount of displacement determining unit 28, the direction of displacement from the direction of displacement detector 29, and the shift amount and the amount of displacement from the amount of displacement detecting chart determining unit 31. When, for example, the direction of displacement is determined upward based on the first detecting chart 39, a peak position is found in stage+1 based on the third detecting chart 43, a peak position in the amount of displacement detecting chart 45d is closest to the middle based on the second detecting chart 41, and the peak position corresponds to stage+1, the total amount of displacement will be 336 μm+252 μm+21 μm=609μ, for example, which together with the direction added will provide+609 μm.

According to this embodiment, testing image data is acquired by scanning with the tester 17 the testing chart 37 printed by the printing controller 25. The total amount of displacement calculator 33 calculates an amount of displacement of a recording position including the direction of a misregister as a total amount of displacement, based on a large amount of displacement determined by the large amount of displacement determiner 28, a direction of displacement detected by the direction of displacement detector 29, a shift amount corresponding to an amount of displacement detecting chart 45 determined by the amount of displacement detecting chart determiner 31, and a peak position of the amount of displacement detecting chart 45 determined by the amount of displacement detecting chart determiner 31. Therefore, since the total amount of displacement of the misregister can be calculated only by forming the testing chart 37 on the web paper WP, the amount of displacement of the misregister in the transport direction can be obtained easily in a short time.

With the five amount of displacement detecting charts 45a-45e of the second detecting chart 41 of the testing chart 37, the periodicity of the amount of displacement detecting charts 45a-45e may cause the shift amount and peak position of the amount of displacement detecting charts 45a-45e to become similar even when a misregister occurs in the opposite direction. However, the direction of displacement detected with the first detecting chart 39 can prevent an erroneous determination indicating the opposite direction. While a detectable amount of displacement is small where only one amount of displacement detecting chart 45 is used, increased amounts of displacement can be calculated since the second detecting chart 41 includes the amount of displacement detecting charts 45a-45e with varied shift amounts.

The third detecting chart 43 corresponds to the amount of displacement detecting chart 45 enlarged in the transport direction. The total amount of displacement calculator 33 calculates a total amount of displacement combining also a large amount of displacement indicated by its peak position and having the amount of displacement enlarged in the transport direction. It is therefore possible to obtain also a large amount of displacement that cannot be detected with the second detecting chart 41 alone.

This invention is not limited to the foregoing embodiment, but can be modified as follows:

(1) In the foregoing embodiment, one stage in the second detecting chart 41 is formed of two displacement lines 49. Since what is necessary is just to be able to detect a difference in density, the number of lines is not limited to two, but may be three or more.

(2) In the foregoing embodiment, the five amount of displacement detecting charts 45 of the second detecting chart 41 are formed along the transport direction, but may be formed in a direction perpendicular to the transport direction.

(3) In the foregoing embodiment, the large amount of displacement is determined with the third detecting chart 43. However, this third detecting chart 43 is not indispensable to this invention. That is, when misregisters are relatively small, the testing chart 37 may be formed of only the first detecting chart 39 and second detecting chart 41.

(4) In the foregoing embodiment, the second detecting chart 41 is formed of five amount of displacement detecting charts 45a–45e. This invention is not limited to this. For example, when misregisters are relatively small, the second detecting chart 41 may be formed of the two amount of displacement detecting charts 45a and 45b.

(5) In the foregoing embodiment, the web paper WP has been used as printing medium, but this invention is applicable also to other printing medium such as film.

(6) In the foregoing embodiment, the inkjet type has been used as printing apparatus, but this invention is applicable also to other types of printing apparatus.

Figure 11:
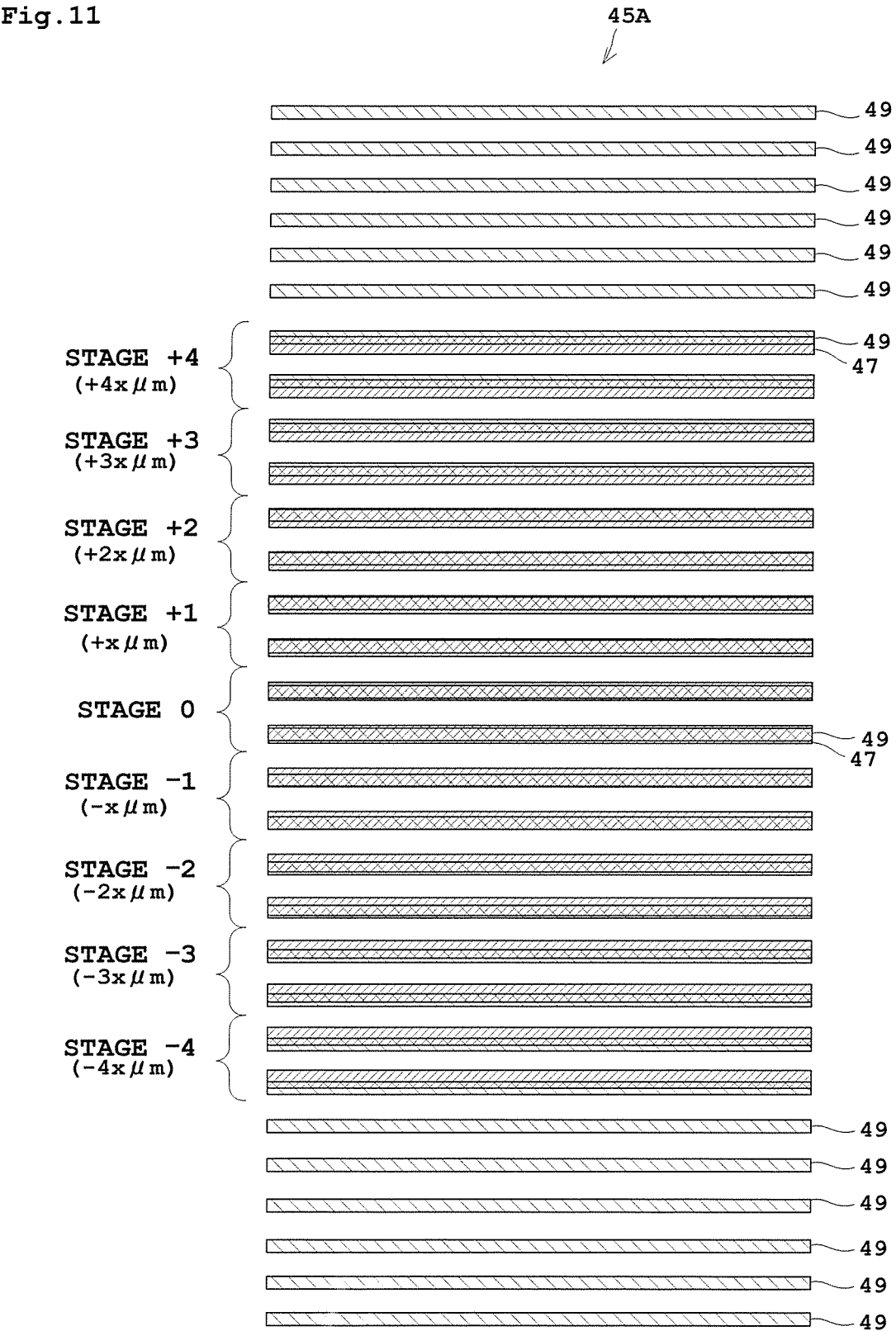
FIG. 11 is a schematic view showing another example of second detecting chart.

(7) In the foregoing embodiment, as shown in FIG. 5, the amount of displacement detecting chart 45 is printed with the displacement lines 49 placed in the middles between the baselines 47. This invention is not limited to this form. As shown in FIG. 11, for example, the displacement lines 49 may be printed in the middle of the baselines 47, while the deviation is increased from the baselines 47 adjacent the middle baselines 47 progressively toward the ends. In this case, stage 0 corresponds to a minimum value of density (density is the lowest and is bright). And with an increase in the amount of displacement, a peak position where density is the lowest (bright) will move toward the ends.

(8) The foregoing embodiment has illustrated an example in which the print head 19a serves as the reference print head and misregisters of the other print heads 19b-19d are corrected. This invention is not limited to the print head 19a being the reference print head. For example, the print head may be other than the print head 19a.

(9) The foregoing embodiment has been described exemplifying misregisters of the four print heads 19a-19d. However, This invention is applicable also where, for example, one print head 19 includes a plurality of print heads which are arranged in alternate staggers like in a zigzag arrangement in the transport direction, and any one of the print heads (hereinafter called internal print heads) of the one print head 19 may be used as the reference print head, and the test chart 37 is formed in order to correct misregisters of the other internal print heads.

Figure 12:
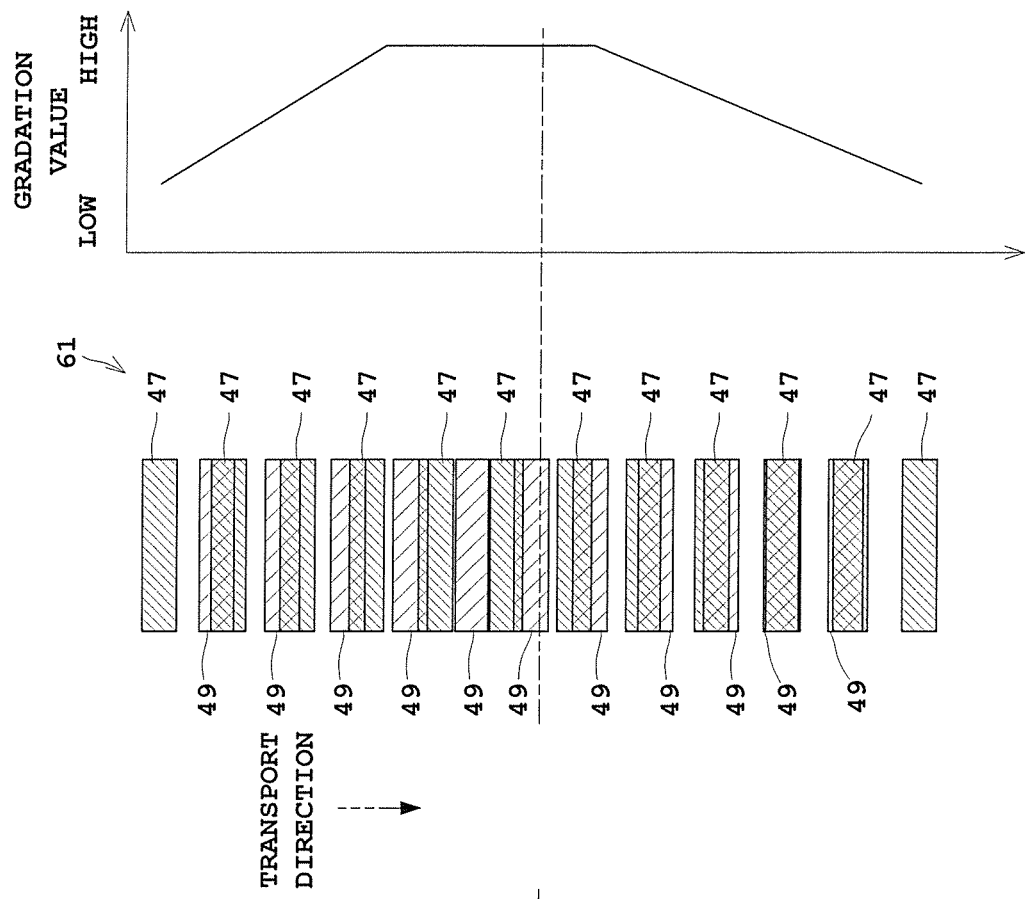
FIG. 12 is a schematic view showing one example of combination chart formed by combining the first detecting chart and third detecting chart, in which (a) shows a state with no misregister and a distribution of gradation values, and (b) shows a state with a misregister and a distribution of gradation values.
Figure 12:
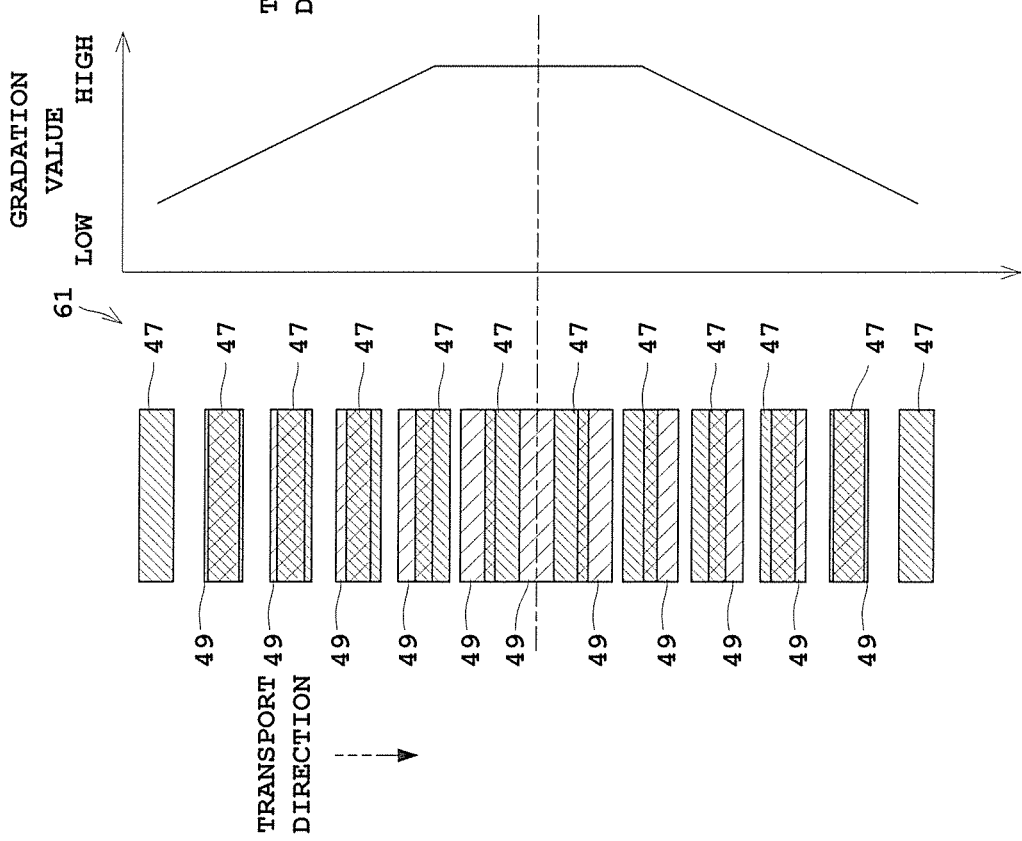

(10) In the foregoing embodiment, the first detecting chart 39 for detecting directions of displacement and the third detecting chart 43 for detecting large amounts of displacement are printed individually, but these charts may be combined. Reference is made here to FIG. 12. FIG. 12 shows one example of combination chart formed by combining the first detecting chart and third detecting chart, in which (a) shows a state with no misregister and a distribution of gradation values, and (b) shows a state with a misregister and a distribution of gradation values.

A combination chart 61 formed by combining the first detecting chart 39 and third detecting chart 43, as shown in FIG. 12(a), has the displacement lines 49 arranged in the middle between the adjacent baselines 47 to fill substantially completely base portions between the baselines 47 in the middle of the third detecting chart 43, with the deviations increased from the middle between the baselines 47 to the middle of the combination chart 61, progressively toward the opposite ends of the baselines 47. With the combination chart 61 formed in this way, a peak position moves according to an amount of displacement and according to a direction of displacement as shown in FIG. 12(b). This combination chart 61 can therefore serve as both the first detecting chart 39 and third detecting chart 43, thereby to make effective use of the printing area of the web paper WP.

(11) In the foregoing embodiment, the amount of displacement detecting chart determiner 31 determines a stage based on the gradation value in the scan image data of the second detecting chart 41, and obtains an amount of displacement corresponding to that stage. The large amount of displacement determiner 28 determines a stage based on the gradation value in the scan image data of the third detecting chart 43, and obtains an amount of displacement corresponding to that stage as the large amount of displacement. However, in this invention, it is preferred to obtain the above amounts of displacement in the following way. This will be described hereinafter with reference to FIGS. 13 and 14. FIG. 13(a) is a schematic view of scan image data of the amount of displacement detecting chart, and FIG. 13(b) is a schematic view showing an example of dispersion values calculated from the scan image data. FIG. 14 is a view illustrating obtaining of a vertex of a quadratic function and calculating values between discrete values.

While description will be made here taking the amount of displacement detecting chart 45 of the second testing chart 41 for example, the same applies also to the third detecting chart 43. Assume, for example, that scan image data as shown in FIG. 13(a) is obtained from the amount of displacement detecting chart 45 of the second testing chart 41. And for each stage corresponding to the scan image data, a dispersion value of the gradation values in the stage is calculated. Thus, by calculating the dispersion value of the gradation values in the stage of the scan image data, and not the gradation values (density) in the stage or an average value of the gradation values in the stage, because of being effective on the values to the second power, it is easy to produce differences in value between the stages. It is therefore easy to determine a stage where the peak position exists within the amount of displacement detecting chart 45, and even if the peak position exists between the stages as described hereinafter, this position can be made easy to calculate accurately.

Assume here that the dispersion value of each stage calculated from the amount of displacement detecting chart 45 is as shown in FIG. 13(b). In the case of the determining method in the foregoing embodiment, stage 0 where the dispersion value corresponding to the peak position is the smallest will be determined. In practice, the smallest dispersion value can be found between stage 0 and stage+1 or stage 0 and stage−1. However, because of the resolution of the tester 17, even when the peak position exists between the stages, the determining method in the foregoing embodiment cannot determine the peak position between the stages. That is, the foregoing embodiment cannot determine amounts of displacement with a resolution higher than the resolution of the tester 17. In other words, the accuracy of amounts of displacement to be determined in the foregoing embodiment is dependent on the resolution of the tester 17.

So, each dispersion value is approximated to a quadratic expression by least-squares method, for example, and a peak position which is a minimum of dispersion values existing between the stages is determined from an approximate curve of a quadratic function. Although the peak position can similarly be determined with even functions such as a quartic function, instead of the quadratic function, the quadratic function is preferred considering the load at the time of arithmetic operation. In the quadratic approximate curve, as shown in FIG. 14, where y is a dispersion value, and x is the stage direction, since dispersion value y is expressed by $y=ax^2+bx+c$, the peak position in the stage direction can be obtained from $x=-b/2a$.

Assume that the quadratic approximate curve is $y=160.77x^2+94.665x+200.35$ from the dispersion values of stage 0 to stage±2 in FIG. 13(b). The peak position will become $x=94.665/2\times160.77=-0.2944$. Therefore, when one stage corresponds to an amount of displacement which is 84 micrometers, the amount of displacement=$-0.2944\times84=-24.7$ micrometer, resulting in the amount of displacement of about 25 μm. While the amount of displacement corresponding to stage 0 is 0 μm in the foregoing embodiment, the present method gives about 25 μm, thus obtaining the amount of displacement with increased strictness.

Industrial Utility

As described above, this invention is suitable for a printing apparatus, an amount of displacement calculating method, and a testing chart for carry out various types of printing including the testing chart.

REFERENCE SIGNS LIST

WP . . . web paper
3 . . . inkjet printing apparatus
7, 11 . . . drive rollers
9 . . . transport rollers
13 . . . printing unit
17 . . . tester
19 (19a-19d) . . . print heads
21 . . . inkjet nozzles
25 . . . printing controller
27 . . . testing chart storage unit
28 . . . large amount of displacement determiner
29 . . . direction of displacement detector
31 . . . amount of displacement detecting chart determiner
33 . . . total amount of displacement calculator
35 . . . corrector
37 . . . testing chart
39 . . . first detecting chart
41 . . . second detecting chart
43 . . . third detecting chart
39a . . . upper detecting charts
39b . . . lower detecting charts
39R . . . reference line segments
39M . . . moving line segments
45 (45a-45e) . . . amount of displacement detecting charts
47 . . . baselines
49 . . . displacement lines

The invention claimed is:

1. A printing apparatus comprising:
a plurality of print heads spaced apart from one another in a transport direction of a printing medium, wherein the plurality of print heads includes 1) a reference print head and 2) a test print head for which a total displacement amount of a recording position of the test print head is calculated;
a printing control device that prints a testing chart on the printing medium using the reference print head and the test print head, the testing chart including:
a first detecting chart including 1) first reference segments printed using the reference print head and 2) first test segments printed using the test print head, wherein the first test segments are printed relative to respective first reference segments,
wherein the first detecting chart is used for detecting a direction of displacement of the recording position of the test print head in the transport direction relative to the reference print head; and
a second detecting chart including displacement charts printed at intervals in the transport direction, wherein each of the displacement charts includes 1) second reference segments printed using the reference print head and 2) second test segments printed using the test print head, wherein the second test segments are printed relative to the second reference segments, wherein one of the displacement charts is designated as a reference displacement chart, wherein each of the intervals corresponds to a maximum amount of displacement detectable by a single displacement chart, wherein the second detecting chart is used for detecting an amount of displacement of the recording position of the test print head in the transport direction relative to the reference print head,
a scanning device that 1) scans the first detecting chart and the second detecting chart printed on the printing medium and 2) acquires an image of the printed first detecting chart and the printed second detecting chart;
a displacement direction detecting device that:
identifies the printed first detecting chart from the acquired image; and
detects the displacement direction of the recording position of the test print head in the transport direction based on the printed first detecting chart;
a displacement amount determining device that:
identifies the printed displacement charts of the second detecting chart from the acquired image, wherein the printed displacement charts each includes a middle position and a peak position, wherein the middle position corresponds to a midpoint of the printed displacement chart in the transport direction, wherein the peak position corresponds to a position having a maximum gradation value within the printed displacement chart;

selects, from the printed displacement charts, a first displacement chart having a shortest distance between the peak position and the middle position;

determines a displacement amount of the peak position within the selected first displacement chart based on a distance from the peak position to the middle position of the selected first displacement chart; and determines a shift amount of the selected first displacement chart based on multiplying the maximum amount of displacement by a number of the intervals between the reference displacement chart and the selected first displacement chart; and a total displacement amount calculating device that calculates the total amount of displacement of the recording position of the test print head based on 1) the detected direction of displacement, 2) the determined shift amount of the determined first displacement chart of the second detecting chart, and 3) the determined displacement amount of the peak position within the determined first displacement chart of the second detecting chart, wherein each of the displacement charts is divided into a plurality of stages in the transport direction, wherein each of the plurality of stages corresponds to a predetermined range within the displacement chart in the transport direction, and wherein the displacement amount determining device 1) acquires a plurality of gradation values for each of the plurality of stages in the displacement chart, 2) calculates a single dispersion value for each of the stages from the plurality of gradation values, 3) obtains an approximate curve of an even function that approximates correspondence between positions of the stages in the transport direction and dispersion values based on the calculated dispersion values, and 4) determines the peak position of the displacement chart based on the approximate curve.

2. The printing apparatus according to claim 1, wherein the first reference segments printed using the reference print head include 1) downstream first reference segments and 2) upstream first reference segments, wherein the first test segments printed using the test print head include 1) downstream first test segments and 2) upstream first test segments, wherein the downstream first test segments are printed 1) to fit within a width of a corresponding downstream reference segment in the transport direction and 2) to be in close contact with a downstream side of the corresponding downstream first reference segment in the transport direction, and wherein the upstream first test segments are printed 1) to fit within a width of a corresponding upstream reference segment in the transport direction and 2) to be in close contact with an upstream side of the corresponding upstream first reference segment in the transport direction.

3. The printing apparatus according to claim 1, wherein the approximate curve is obtained from least-squares method.

4. The printing apparatus according to claim 1, wherein the approximate curve of the even function is an approximate curve represented by the quadratic function, $y=ax^2+bx+c$, where y is the dispersion value and x is the positional values in the transport direction, and wherein the peak position, $x=-b/2a$, of the approximate curve represented by the quadratic function is determined as the peak position of the displacement chart.

* * * * *